United States Patent
Ogawa et al.

(10) Patent No.: US 6,699,637 B2
(45) Date of Patent: Mar. 2, 2004

(54) PROCESS FOR PRODUCING OPTICAL INFORMATION RECORDING MEDIUM AND OPTICAL INFORMATION RECORDING MEDIUM PRODUCED BY THE PROCESS

(75) Inventors: Shuichiro Ogawa, Fuji (JP); Keigo Takeguchi, Fuji (JP); Atsushi Fujii, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/402,932

(22) PCT Filed: Apr. 15, 1998

(86) PCT No.: PCT/JP98/01715
§ 371 (c)(1),
(2), (4) Date: Oct. 14, 1999

(87) PCT Pub. No.: WO98/47142
PCT Pub. Date: Oct. 22, 1998

(65) Prior Publication Data
US 2003/0152866 A1 Aug. 14, 2003

(30) Foreign Application Priority Data
Apr. 16, 1997 (JP) ............................................. 9-099113
Sep. 30, 1997 (JP) ............................................. 9-266919
Sep. 30, 1997 (JP) ............................................. 9-283087
Dec. 17, 1997 (JP) ............................................. 9-348114

(51) Int. Cl.$^7$ ................................................. G11B 7/24
(52) U.S. Cl. ............... 430/270.13; 430/945; 369/275.2; 369/288; 369/286; 428/64.5
(58) Field of Search ............................ 430/945, 270.13; 428/64.5; 369/275.2, 286, 288

(56) References Cited

U.S. PATENT DOCUMENTS 4,670,345 A * 6/1987 Morimoto et al. .......... 430/945
4,889,746 A * 12/1989 Utsumi et al. .............. 427/162
5,011,723 A 4/1991 Harigaya et al. ............ 428/64

(List continued on next page.)

FOREIGN PATENT DOCUMENTS

| EP | 0 499 273 A2 | 8/1992 |
| JP | 63175242 | 1/1987 |
| JP | 62-53886 | 3/1987 |

(List continued on next page.)

OTHER PUBLICATIONS

Translation of JP 63–176185.*
Joint MORIS (Magneto–Optical Recording International Symposium)/ISOM (International Symposium on Optical Memory), Technical Digest, pp. 292–293 (1997).

(List continued on next page.)

Primary Examiner—Martin Angebranndt
(74) Attorney, Agent, or Firm—Finnegan, Henderson, Farabow, Garrett, & Dunner, L.L.P.

(57) ABSTRACT

An optical information recording medium which can eliminate the necessity for the initialization process. A crystallization assisting layer (3) comprising a given material is formed over a substrate (1) on one side thereof, and a recording layer (4) comprising a Ge—Sb—Te alloy is formed directly on the layer (3). Since the recording layer (4) crystallizes immediately after film formation, no initialization process is necessary for the optical information recording medium obtained. Examples of the material of the crystallization assisting layer firstly include materials having a face-centered cubic lattice system crystal structure. Examples thereof secondly include tellurium-free materials having a rhombohedral lattice system crystal structure. An especially preferred crystallization assisting layer is a discontinuous island-like film made of a material comprising bismuth and/or a bismuth compound. Incorporation nitrogen into the crystallization assisting layer provides an optical information recording medium which need not be initialized and has excellent overwrite cyclability.

7 Claims, 6 Drawing Sheets

U.S. PATENT DOCUMENTS

| | | | | |
|---|---|---|---|---|
| 5,194,363 A | * | 3/1993 | Yoshioka et al. | 430/270.13 |
| 5,395,735 A | * | 3/1995 | Nagata et al. | 430/270.13 |
| 5,543,271 A | * | 8/1996 | Miwa et al. | 430/945 |
| 6,115,352 A | * | 9/2000 | Ohno et al. | 430/270.13 |
| 6,406,772 B2 | * | 6/2002 | Tominaga et al. | 430/270.13 |

FOREIGN PATENT DOCUMENTS

| | | | | |
|---|---|---|---|---|
| JP | 63-176185 | * | 7/1988 | |
| JP | 405-062249 | * | 3/1993 | 430/270.13 |
| JP | 06314439 | | 11/1993 | |
| JP | 5-342629 | | 12/1993 | |
| JP | 06-195747 | * | 7/1994 | |
| JP | 8-221814 | | 8/1996 | |
| JP | 9-161316 | | 6/1997 | |
| JP | 11-96594 | | 4/1999 | |
| JP | 11-96596 | | 4/1999 | |

OTHER PUBLICATIONS

T. Nishida et al., "Single–Beam Overwrite Experiment Using In–Se Based Phase–Change Optical Media", Appl. Phys. Lett. 50 (11), pp. 667–669, (1987).

A. Ogura et al., "Grain Growth Observation of <100> Textured Germanium Film by Transmission Electron Microscopy", Appl. Phys. Lett. 50 (1), pp. 16–18, (1987).

Wörterbuch der Chemie, Jun. 1, 1995, Deutscher Taschenbuch Verlag, Munchen XP–002134399, p. 37.

* cited by examiner

PROCESS FOR PRODUCING OPTICAL INFORMATION RECORDING MEDIUM AND OPTICAL INFORMATION RECORDING MEDIUM PRODUCED BY THE PROCESS

TECHNICAL FIELD

The present invention relates to phase change optical information recording mediums having a recording layer of changing phase between a crystalline state and an amorphous state in accordance with the intensity of an irradiation beam, and in particular, it relates to a method for producing an optical information recording medium capable of making an initialization process unnecessary.

BACKGROUND ART

Recently, optical information recording mediums have been extensively studied and developed as means for recording, reading and erasing an immense quantity of information. Especially, a so-called phase change optical disk which records/erases information, using the fact that the phase of the recording layer changes reversibly between a crystalline state and an amorphous state, has the advantage that only by changing the laser beam power, old information is erased while new information is being recorded simultaneously (hereinafter referred to as "overwrite"). Thus, such optical disk is regarded as being full of promise.

As the recording materials of such overwritable phase change optical disk, chalcogen alloys are mainly used which include In—Se alloys (see "Appl. Phys. Lett. Vol. 50, p. 667, 1987"), In—Sb—Te alloys (see "Appl. Phys. Lett. Vol. 50, p.16, 1987"), and Ge—Te—Sb alloys (see Japanese Patent Laid-Open Publication Sho No. 62-53886), which have a low melting point and a high absorption efficiency for a laser beam.

When information is actually recorded/erased on/from such optical disk of a chalcogen alloy, at least one kind of dielectric layer of a material selected from the group consisting of metal or semi-metal oxides, carbides, fluorides, sulfides, and nitrides is generally formed directly above and/or under the recording layer in order to prevent the substrate from being deformed due to heat produced on recording/erasing, to prevent the recording layer from being oxidized, and/or to prevent the substances from moving along the guide grooves or from being deformed.

Optical disks having a three- or four-layered structure which includes a recording layer of a chalcogen alloy, a dielectric layer provided directly under and/or above the recording layer, a reflective layer which also acts as a cooling layer (for example, Al-alloy) provided on an opposite side of a transparent substrate from the recording layer, provided on the substrate, are the mainstream of the phase change optical disks because they are preferable in terms of the recording/erasing characteristics.

In general phase change optical disks, when the recording layer is irradiated with a laser beam having a recording power to heat it up to its melting point and is then rapidly cooled, the recording layer material is produced amorphous to thereby form a recording mark. Then, when the recording layer is irradiated with a laser beam having an erasing power to be heated to more than the crystallizing temperature and then gradually cooled, the recording layer material is crystallized to thereby erase the recording mark.

Such phase change optical disks are each produced by sequentially forming thin layers as the respective layers on the substrate by sputtering/evaporation. Since the recording layer present immediately after its layer formation is amorphous, it is irradiated with a laser beam to be wholly crystallized, which is generally referred to as "initialization process", and the optical disks, thus obtained, are then shipped.

However, this initialization process takes a time of a little less than one minute to initialize the whole optical disk having a diameter of 120 mm even with the use of the most-efficient laser beam irradiation, which leads to an increase in the manufacturing cost of the optical disks. For the time required for processing one optical disk in each manufacturing substep (cycle time), the time required for the initialization process is long compared to the substrate molding step or the layer forming step. Thus, in order to eliminate a time loss taken to pass to the initialization process when the cycle time for the layer forming step is 8 seconds, the six or seven very expensive initializing devices are required. As a result, by performing the initialization process, the manufacturing cost of the optical disks is increased.

In order to reduce the time required for the initialization process, for example, Japanese Patent Laid-Open Publication Hei No. 5-342629 discloses providing an auxiliary layer of an easily crystallizable continuous film or discontinuous island-like film adjacent to the recording layer. As the components of the auxiliary layer, compounds are named which include tellurium (Te), Selenium (Se) or Te—Se compounds.

However, according to this method, the time required for initializing the recording layer is reduced, but the initialization process cannot be eliminated as a rule, excluding the case where both of the auxiliary layer and the recording layer are comprised of extremely easily crystal-growing substances.

It is therefore an object of the present invention to provide an optical information recording medium which eliminates the necessity for the initialization process.

DISCLOSURE OF THE INVENTION

The present invention provides a method for producing an optical information recording medium which has on one side of a substrate a recording layer whose main components comprise germanium (Ge), antimony (Sb) and tellurium (Te) (hereinafter referred to as "Ge—Te—Sb alloy "), comprising the steps of forming a crystallization assisting layer of materials having a face-centered cubic lattice system crystal structure on one side of the substrate, and forming a recording layer directly above the crystallization assisting layer. According to this method, the recording layer immediately after its formation is crystallized.

The Ge—Te—Sb alloys take two types of crystal phases: namely, a face-centered cubic lattice system crystal structure and a hexagonal system crystal structure. It is known that as the temperature of this alloy is raised from its amorphous state, its phase changes from a face-centered cubic lattice crystal structure to a hexagonal structure. In the present invention, the recording layer is easily crystallized when its layer is formed due to the presence of the crystallization assisting layer having the same face-centered cubic lattice system crystal structure as the recording layer.

The face-centered cubic lattice system crystal structures include face-centered cubic lattices, and face-centered tetragonal lattice; diamond-shape structures: CuAu—, CuPt—, $Ni_2Cr$—, $Cu_3Au$—, $Ni_4Mo$—, $Ag_3Mg$—, $Ni_3V$—, $Cu_3Pd$—, and $Au_3Mn$-type superlattices; NaCl—, NaTl—, ZnS—, CaF$_2$—, FeS$_2$—, cristobalite high-temperature-, Laves phase MgCu$_2$—, Cu$_3$Au—, Al$_3$Ti—, Cu$_2$AlMn—, Al$_2$MgO$_4$—, and Bi$_2$Te$_3$-type structures; and their interstitial and substitutional solid solutions.

The present invention also provides a method for producing an optical information recording medium having on one side of a substrate a recording layer whose main components comprise germanium (Ge), antimony (Sb) and tellurium (Te), comprising the steps of forming on one side of a substrate a crystallization assisting layer of a tellurium (Te)-free material having a crystal structure of a rhombohedral lattice system, and forming a recording layer directly over the crystallization assisting layer. According to this method, the recording layer becomes crystallized immediately after its formation.

In the present invention, the absolute value of a lattice unconformity between the crystal structure of the crystallization assisting layer and that of the recording layer is preferably not more than 8%. The lattice unconformity is represented by:

$$\text{Lattice unconformity } (\%) = ((B-A)/A) \times 100 \quad (a)$$

A: When the recording layer is of a face-centered cubic lattice system crystal, an atomic interval in a direction <110> of the crystal;

B: A particular one of the atomic intervals of a crystallized crystallization assisting layer such that the difference between A and the particular atomic interval B is minimum among the differences each between A and a respective one of the atomic intervals of the crystallized crystallization assisting layer. In the case of the face-centered cubic lattice system, it is generally the atomic interval in a direction <100> or <110>.

When the crystal comprises two or more kinds of elements, the distance between two adjacent atoms of different kinds may be used as an atomic interval in the expression (a). When A is greatly different from B in the expression (a), the atomic interval B of the crystallization assisting layer may be assumed to be an integer or fraction times the atomic interval.

The range of lattice unconformity is preferably −4.5 to +8%, and more preferably −3 to +7%.

Examples of materials each of which has a crystal structure of a face-centered cubic lattice system where an absolute value of lattice unconformity between the crystal structure of that material and that of the recording layer is not more than 8% include PbTe and Bi$_2$Te$_3$.

Examples of tellurium-free materials each of which has a crystal structure of a rhombohedral system where an absolute value of lattice unconformity between the crystal structure of that material and that of the recording layer is not more than 8% include antimony (Sb), bismuth (Bi), antimony (Sb) compounds, and bismuth (Bi) compounds. The Sb compounds include Sb alloys, and intermetallic compounds of Sb and other metals or semimetals. The Bi compounds include Bi alloys, and intermetallic compounds of Bi and other metals or semimetals.

In the present invention, the thickness of the crystallization assisting layer is preferably not more than 200 Å. If the thickness is larger than 200 Å, the record erasing characteristics would be deteriorated. The thickness of the crystallization assisting layer is more preferably not more than 100 Å. If this layer is excessively thin, the recording layer can be crystallized insufficiently. Thus, it is preferably not less than 1 Å.

In the present invention, the crystallization assisting layer may be in the form of a continuous film or a discontinuous island-like film, which is contacted with the recording layer. Most preferably, it is a discontinuous island-like film of materials which contain bismuth (Bi) and/or a bismuth (Bi) compound.

The optical information recording medium whose recording layer is crystallized by the crystallization assisting layer provided so as to be contacted with a substrate-side surface of the recording layer eliminates the necessity for the initialization process. If a continuous film of materials which comprise bismuth (Bi) and/or a bismuth (Bi) compound is used as the crystallization assisting layer, the CNR (Carrier to Noise-Ratio) in the second or subsequent recording by overwriting is slightly lower than that in the first recording.

In comparative examples, if a discontinuous island-like film of materials containing bismuth (Bi) and/or a bismuth (Bi) compound is used as the crystallization assisted layer, the CNR in the second or subsequent recording by overwriting is substantially the same as that in the first recording.

The discontinuous island-like film is formed, for example, by sputtering such that its thickness is not more than a predetermined value.

When the crystallinity of the recording layer formed on the crystallization assisting layer is insufficient, the recording layer is preferably formed by setting the temperature of the substrate in a range of from 45° C. through a temperature inclusive above which temperature the substrate would be deformed (at 110° C. when the substrate is produced of polycarbonate). Thus, the recording layer is placed in a stabilized crystalline state.

The methods for maintaining the substrate at high temperatures under formation of the recording layer include (1) heating the substrate or the crystallization assisting layer which underlies the recording layer immediately before the formation of the recording layer to thereby maintain the substrate at high temperature; (2) starting to heat the substrate or the crystallization assisting layer after the formation of the recording layer has started and continuing to heat the substrate or the crystallization assisting layer during the formation of the recording layer; (3) starting to heat the substrate or the layer surface of the recording layer immediately after the recording layer has been formed; and (4) starting to form the recording layer immediately after the preceding layer has been formed, using the heat produced by the formation of the preceding layer and stored within the substrate.

The heating methods include irradiating a surface of the layer formed on the substrate (a surface of the crystallization assisting layer) with light including heat rays; and heating a substrate holder itself with a heater or the like, or using high frequency induction, flash exposure; or plasma processing.

In the producing method of the present invention, the formation of the crystallization assisting layer is preferably performed within a layer forming atmosphere to which a nitrogen gas is added.

When the producing method of the present invention includes the step of forming a first dielectric layer between the substrate and the crystallization assisting layer and/or the step of forming a second dielectric layer on an opposite side of the recording layer from the crystallization assisting layer, the formation of the first and/or second dielectric layer is preferably performed within a layer forming atmosphere to which a nitrogen gas and/or an oxygen gas is added.

The present invention also provides an optical information recording medium with a recording layer formed on one side of a substrate, the recording layer comprising materials whose main components are germanium (Ge), antimony (Sb) and tellurium (Te), wherein the recording layer is formed in a crystalline state and wherein the crystallization assisting layer is formed in contact with the substrate side surface of the recording layer, the recording layer and the crystallization assisting layer being produced by the respective above-mentioned producing methods.

In the inventive optical information recording medium, a ratio x, y, and z of the respective elements (Ge, Sb, Te) of the main components of the recording layer (Ge:Sb:Te=x:y:z where x+y+z=1) is preferably in a range shown hatched in a triangular graph of FIG. 2, which satisfies the following expressions (1)–(3) simultaneously:

$$0.1 \leq x \leq 0.4 \tag{1}$$

$$0.08 \leq y \tag{2}$$

$$0.45 \leq z \leq 0.65 \tag{3}$$

When x<0.1, the optical information recording medium is not preferable in terms of stability. When x>0.4, y<0.08, z<0.45 and z>0.65, these conditions are unpreferable because the recording layer is difficult to crystallize.

A preferable range of the ratio x, y and z of the respective elements of the main components of the recording layer (Ge:Sb:Te=x:y:z where x+y+z=1) should satisfy the following expressions (4)–(6) simultaneously:

$$0.15 \leq x \leq 0.3 \tag{4}$$

$$0.12 \leq y \tag{5}$$

$$0.5 \leq z \leq 0.6 \tag{6}$$

The materials of the recording layer are preferably Ge—Te—Sb—Bi alloys containing Bi in addition to Ge, Te and Sb. The materials may be Ge—Te—Sb or Ge—Te—Sb—Bi alloys, for example, containing hydrogen, nitrogen, oxygen, carbon, Al, Ti, Fe, Co, Ni, Cu, Zn, Ga, Se, Sn, In, Ag, Pd, Rh, Ru, Mo, Nb, Hf, Zr, Ta, W, Re, Os, Ir, Pt, Au, Tl and/or Pb. Those elements may be added from the target during the formation of the recording layer or added in a gaseous state to the atmosphere gas so as to be contained within the recording layer.

In the inventive optical information recording medium, the thickness of the recording layer is preferably 50–1000 Å. If it is less than 50 Å, the recording layer could not obtain a satisfactory recording sensitivity. When it exceeds 1000 Å, a problem about the recording sensitivity and resolution would occur, undesirably.

The inventive optical information recording medium preferably has a 4-layered structure in which a crystallization assisting layer, a recording layer, a dielectric layer and a reflective layer are formed on the substrate in this order. More preferably, the inventive optical information recording medium has a 5-layered structure in which a first dielectric layer, a crystallization assisting layer, a recording layer, a second dielectric layer and a reflective layer are formed on the substrate in this order. The inventive optical information recording medium may further include other necessary layers additionally.

As the first and second dielectric layers, materials having high heat resistance and a melting point of not less than 1000° C. are preferable; for example, $SiO_2$; a mixture of ZnS and $SiO_2$; $Al_2O_3$; AlN; and $Si_3N_4$. Although the thickness of the first dielectric layer is not especially specified, the thickness of the second dielectric layer is preferably 50–500 Å. If it is less than 50 Å, it can not provide a satisfactory recording sensitivity. If it exceeds 500 Å, it cannot provide satisfactory overwrite cyclability. The thickness of the reflective layer is preferably not less than 300 Å.

The methods of forming the respective layers include evaporation, sputtering and ion plating.

A method of confirming the presence of the crystallization assisting layer in the optical information recording medium will be described next.

The first method is to observe a cross section of the optical information recording medium, with a transmission electron microscope. The elements of the crystallization assisting layer can be specified with the aid of an electron beam diffraction apparatus and an energy dispersion X-ray analysis apparatus. When the crystallization assisting layer is island-like or very thin, it is difficult to confirm its presence, using this method.

The second method includes slowly etching layers formed on the substrate of the optical information recording medium, by sputtering, in a direction perpendicular to the substrate surface while analyzing elements present at respective positions in the layers formed on the substrate, using a secondary ion mass spectrometry (SIMS) or Auger electron spectroscopy (AES). This method is effective when the crystallization assisting layer is island-like or very thin.

According to this method, as the recording layer is slowly etched toward an interface between the recording layer and the crystallization assisting layer while the elements are being analyzed, the quantity of elements which compose the crystallization assisting layer increases toward the interface between the crystallization assisting layer and its underlying layer (generally, the dielectric layer), and after the interface is reached, rapidly decreases. By finding this phenomenon, the presence of the crystallization assisting layer will be known.

As an example, in the case of an optical disk which has a layer structure of a substrate/a first dielectric layer/a crystallization assisted layer/a recording layer/a second dielectric layer/a reflective layer/a UV set resin layer, a method of confirming the presence of the crystallization assisting layer, using the second method, will be explained as follows. First, an adhesive tape is adhered to the UV set resin layer to thereby separate the layered layer from the substrate. At this time, since the second dielectric layer is generally separated from the recording layer, the substrate on which the recording layer and the crystallization assisting layer remain is put into the secondary ion mass spectrometry or Auger electron spectroscopy to analyze the elements using by etching slowly from the recording layer side.

In the case of an optical disk where the recording layer comprises Ge, Te and Sb and where the crystallization assisting layer is in the form of a discontinuous island-like film of Bi, the presence of Ge, Te and Sb is first confirmed by analysis of the elements. As the layers on the substrate are further etched, the presence of Bi is recognized. By further etching, the quantity of Bi increases whereas the quantities of Ge, Te and Sb decrease gradually. When the dielectric layer is reached, no presence of Ge, Te, Sb and Bi is recognized. Thus, when such phenomenon is found in the second method, it can be determined that the optical disk comprises a crystallization assisting layer comprised of a discontinuous island-like film of Bi.

An optical disk whose recording layer is crystallized immediately after its formation is easily distinguished from an optical disk whose recording layer is crystallized in the initialization process, with the following method.

In the optical disk whose recording layer is crystallized by an initializing device using general laser-beam irradiation, the innermost and outermost peripheries of the recording layer are not initialized to remain amorphous state due to the composition of the initializing device. Thus, the innermost and outermost peripheries of the disk and its intermediate portion are different in reflectivity, which will be visually recognized by those skilled in the art. In comparative examples, in the optical disk whose recording layer is crystallized immediately after its formation and not subjected to the initialization process, there is no such difference in reflectivity because the whole surface of the recording layer is crystallized.

BEST MOOD FOR CARRYING OUT THE INVENTION

First Embodiment

Figure 1:
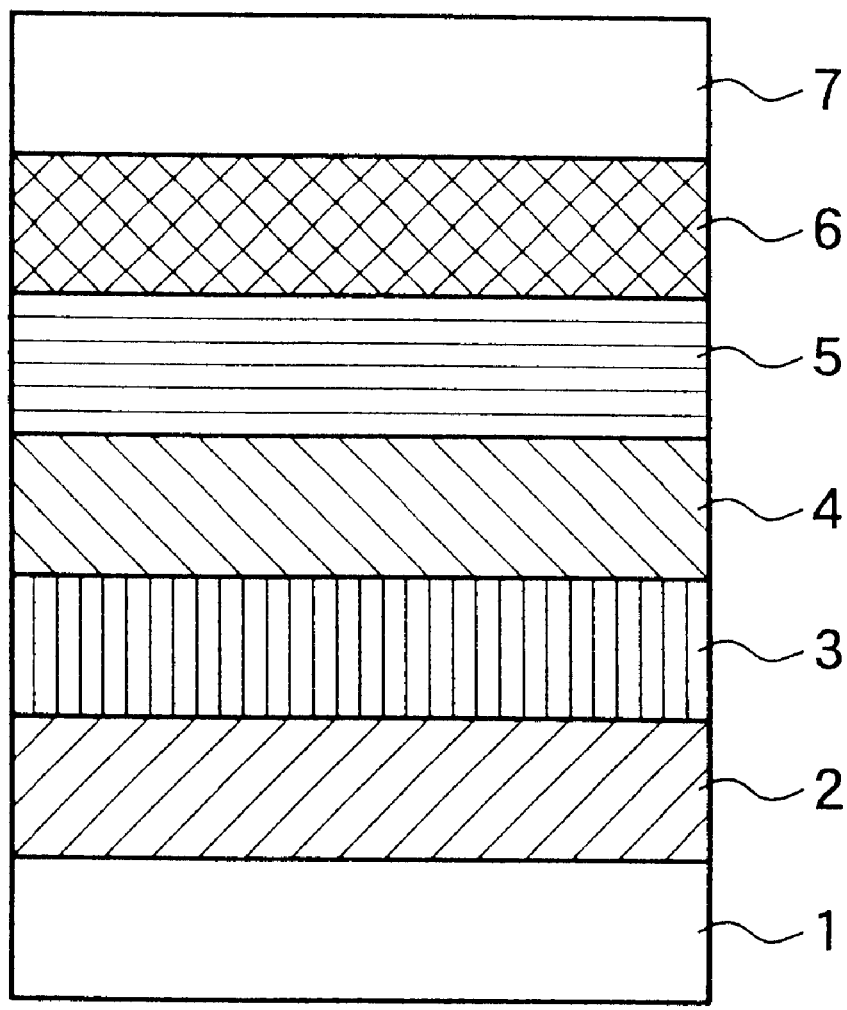
FIG. 1 is a cross-sectional view of a layer structure of an optical information recording medium corresponding to one embodiment of the present invention.
Figure 2:
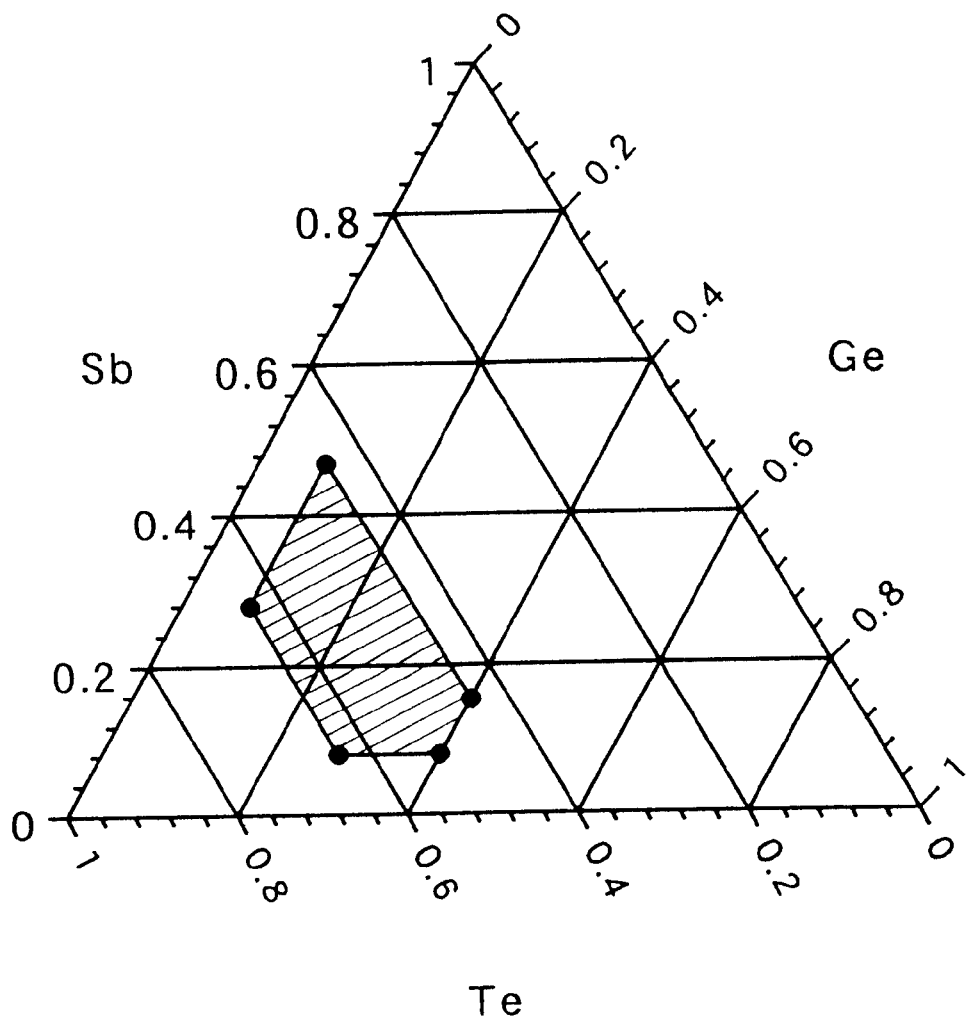
FIG. 2 is a triangular graph indicative of a preferable range of a ratio of the respective elements of Ge—Sb—Te as the main components of the recording layer.

Phase change optical disks each having a layer structure of FIG. 1 were produced as follows:

First, as each substrate 1, a polycarbonate substrate with a center hole was prepared, having a diameter of 120 mm, a thickness of 0.6 mm, and a helical guide groove of 0.74 µm in width and 1.4 µm in track pitch.

Then, formed on this substrate 1 were a first dielectric layer 2 of a mixture of ZnS and $SiO_2$ (the content of $SiO_2$ is 30 mole %) and having a thickness of 2500 Å, a crystallization assisting layer 3 produced of each of materials shown in Table 1 and having a corresponding thickness also shown in Table 1, a recording layer 4 of a Ge—Te—Sb alloy having a thickness of 200 Å, a second dielectric layer 5 of a mixture of ZnS and $SiO_2$ (the content of $SiO_2$ is 30 mole %) having a thickness of 150 Å, and a reflective layer 6 of an Al—Ti alloy (the content of Ti is 1.1 atom %) having a thickness of 800 Å in this order. In a comparative example 1-1, no crystallization assisting layer 3 was formed. A UV cured resin layer 7 was formed on the reflective layer 6.

The formation of the first and second dielectric layers 2 and 5 was performed by RF sputtering, using a mixture of ZnS and $SiO_2$ (the content of $SiO_2$ was 30 mole %) as the target. An argon gas was used as the atmosphere gas for sputtering.

The formation of the crystallization assisting layer 3 was performed by DC sputtering, using each of the materials whose purity was 99.9 atom % as the target. An argon gas was used as the atmosphere gas.

The formation of the recording layer 4 was performed by DC sputtering, using a Ge—Te—Sb alloy as the target. An argon gas was used as the atmosphere gas. Analysis of the recording layer 4 by a fluorescent X-ray clarified that the composition of the formed recording layer was: Ge=21 atom %, Te=24 atom %, and Sb=55 atom %.

The formation of the reflective layer 6 was performed by DC sputtering, using an Al—Ti alloy (the contents of Ti was 1.1 atom %) as the target. An argon gas was used as the atmosphere gas.

The formation of the UV cured resin layer 7 was performed by spin-coating the reflective layer 6 with a UV curable resin, and then by irradiating the resin with UV rays.

Table 1, attached hereto, shows the materials and thicknesses, crystal structures, the values of B of the expression (a) (atomic intervals of the crystals), and the values of lattice unconformity calculated from the expression (a) of the crystallization assisting layers the respective examples and comparative examples.

The value of A of the expression (a) is 4.325 Å. When the crystal structure has a hexagonal system, the value of B is one of the atomic interval in the a-axial direction and the atomic interval in the c-axial direction, which has the smaller one of the differences between A and these atomic intervals. When the crystal structure has a body-centered cubic lattice system, the value of B is one of the atomic interval in a <100> direction and the atomic interval in a <111> direction, which has the smaller one of the differences between A and these atomic intervals. When the crystal structure has a monoclinic system, the value of B is the atomic interval between the closest atoms.

First, the reflectivity and recording characteristics (CNR (Carrier to Noise Ratio) and erase ratio) of each of examples 1-1 to 1-4 and comparative examples 1-1 to 1-7 of uninitialized optical disks, thus obtained, were measured. Then, the reflectivity and recording characteristics (CNR and erase ratio) of each example after its initialization were measured.

The measurement of the CNR and erase ratio of the disk of each example was performed after recorded once and by overwriting, 100 times. The measurement of the reflectivity and the recording characteristics was performed with the aid of a laser of a wavelength of 640 nm with an objective lens having a NA of 0.6.

The initialization was performed by rotating the disk at a linear velocity of 5 m/s and causing a laser beam of a wavelength of 820 nm to scan the same place on the disk ten times or more. The cross-sectional outline of the laser beam was an ellipse having a longer axis of 96 µm and a shorter axis of 1.5 µm. Thus, a flat area between two adjacent guide grooves was also initialized so as to have the same state as the guide grooves.

The measurement of the disk reflectivity was performed on guide groove-free flat portions of each disk before and after its initialization. The measurement of the disk reflectivity after its initialization was performed after it was confirmed that the disk was sufficiently crystallized in the initialization process such that the reflectivity was saturated.

The measurement of the C/N ratio of each disk was performed after a single signal whose mark and space lengths were 0.61 µm was recorded once and after the same signal was overwritten 100 times during the disk rotation at a linear velocity of 6 m/s.

The measurement of the erase ratio was performed by measuring an amount of a decrease in the carrier wave of a signal whose mark and space lengths were 0.61 µm after a signal whose mark and space lengths were 0.61 µm was recorded once or overwritten 100 times and further a signal whose mark and space lengths were 2.85 µm was overwritten once. The results of those measurements are together shown in Table 2 attached hereto.

As will be seen from Table 2, the crystal structures of the materials which compose the crystallization assisting layers of the examples 1-1 to 1-4 are of a face-centered cubic lattice system and the absolute value of the lattice unconformity is not more than 8%. Thus, satisfactory results were obtained before the initialization; that is, the C/N ratio was 45 dB or more, the erase ratio was 20 dB or more, and the reflectivity was 15% or more. The difference between before and after the initialization about the reflectivity, C/N ratio and erase ratio was small. There was no large difference between after recorded once and 100 times about C/N ratio and erase ratio. Thus, the necessity for the initialization process can be eliminated.

In comparative examples, the comparative examples 1-1 to 1-7 exhibited no results which satisfied all of the conditions, that is; 45 dB or more of the C/N ratio, 20 dB or more of the erase ratio, and 15% or more of the reflectivity as the characteristics before the initialization, but exhibited satisfactory results after the initialization. Thus, the initializing step cannot be eliminated. The crystal structures of the materials which compose the crystallization assisting layers of the comparative examples 1-4 and 1-5 are of a rhombohedral lattice system, but contain Te. Thus, those results were obtained.

The comparative example 1-4 used materials of the crystallization assisting layer which contains Te and Se. Preferably, Se should not be used because it has toxicity and is required to handle with care when the target is produced or the layer is formed. Thus, the composition of the comparative examples 1-4 is not preferable because the necessity for the initialization process cannot be eliminated as well as the producing step is complicated.

Second Embodiment

EXAMPLE 2-1

A phase change optical disk having the same layer structure as the FIG. 1 one was produced as follows.

First, a first dielectric layer 2 having a thickness of about 1400 Å was formed on a polycarbonate substrate 1 having a diameter of 90 mm and a thickness of 0.6 mm with a guide groove for a laser beam by RF sputtering with the aid of a target of ZnS—SiO$_2$. A Sb layer having a thickness of 50 Å was then formed as the crystallization assisting layer 3 on the first dielectric layer 2 by sputtering with the aid of a target of Sb.

A recording layer 4 having a thickness of 200 Å of Ge$_2$Te$_5$Sb$_2$ was formed on the crystallization assisting layer 3 by sputtering with the aid of a target of a Ge—Te—Sb alloy. A second dielectric layer 5 having a thickness of 200 Å was then formed on the recording layer 4 by sputtering with the aid of a target of ZnS—SiO$_2$. A reflective layer 6 having a thickness of 1500 Å was then formed on the second dielectric layer 5 by sputtering with the aid of a target of an Al alloy. A UV curable resin was then spin-coated on the reflective layer 6 to be cured to thereby form a UV cured resin layer 7.

In the recording layer 4 of the phase change optical disk, the ratio x, y, and z of the respective quantities of the component elements Ge, Sb and Te(Ge:Sb:Te=x:y:z where x+y+z=1) was 0.22:0.22:0.56, which satisfied the expressions (1)–(3) simultaneously.

Comparative Example 2-1

A phase change optical disk was produced in a manner similar to that in which the example 2-1 was produced, excluding that no crystallization assisting layer 3 was formed.

EXAMPLE 2-2

A phase change optical disk having the same layer structure as the FIG. 1 one was produced as follows:

A first dielectric layer 2 having a thickness of about 1400 Å was formed on a substrate 1 similar to that of the example 2-1 in a manner similar to that in which the example 2-1 was produced. A Sb layer having a thickness of 65 Å was then formed as the crystallization assisting layer 3 on the first dielectric layer 2 in a manner similar to that in which the example 2-1 was produced. Then, the crystallization assisting layer 3 was irradiated with light (for five minutes at a power of 500 W) from a halogen lamp to further crystallize the crystallization assisting layer 3.

A recording layer 4 of Ge$_{31}$Te$_{57}$Sb$_{12}$ having a thickness 225 Å was then formed on the crystallization assisting layer 3 by sputtering with the aid of a target of a Ge—Te—Sb alloy. A second dielectric layer 5 of ZnS—SiO$_2$ having a thickness of 200 Å, and a reflective layer 6 of an Al alloy having a thickness of 1500 Å were then sequentially formed by sputtering on the recording layer 4 in a manner similar to that in which the example 2-1 was produced. A UV cured resin layer 7 was then formed and set on the reflective layer 6 as in the example 2-1.

In the recording layer 4 of the phase change optical disk, the ratio x, y, and z of the respective quantities of the component elements Ge, Sb, and Te was Ge:Sb:Te=x:y:z= 0.31:0.21:0.57 where x+y+z=1, and satisfied the expressions (1)–(3) simultaneously.

EXAMPLE 2-3

A phase change optical disk having the same layer structure as the FIG. 1 one was produced as follows:

A first dielectric layer 2 having a thickness of about 1400 Å was formed on a substrate 1 similar to that of the example 2-1 in a manner similar to that in which the example 2-1 was produced. A Bi layer having a thickness of 50 Å was then formed as the crystallization assisting layer 3 on the first dielectric layer 2 by sputtering with the aid of a target of Bi. Then, the crystallization assisting layer 3 was irradiated with light (for five minutes at a power of 500 W) from a halogen lamp to further crystallize the crystallization assisting layer 3.

A recording layer 4 of Ge$_{23}$Te$_{54}$Sb$_{23}$ having a thickness of 225 Å was then formed on the crystallization assisting layer 3 by sputtering with the aid of a target of a Ge—Te—Sb alloy. A second dielectric layer 5 of ZnS—SiO$_2$ having a thickness of 200 Å, and a reflective layer 6 of an Al alloy having a thickness of 1500 Å were then sequentially formed by sputtering on the recording layer 4 in a manner similar to that in which the example 2-1 was produced. A UV cured resin layer 7 was then formed and set on the reflective layer 6 as in the example 2-1.

In the recording layer 4 of the phase change optical disk, the ratio x, y, and z of the respective quantities of the component elements Ge, Sb, and Te was Ge:Sb:Te=x:y:z= 0.23:0.23:0.54 where x+y+z=1, and satisfied the expressions (1)–(3) simultaneously.

EXAMPLE 2-4

A phase change optical disk having the same layer structure as the FIG. 1 was produced as follows:

A first dielectric layer 2 having a thickness of about 1400 Å was formed on a substrate 1 similar to that of the example 2-1 in a manner similar to that in which the example 2-1 was produced. A Bi layer having a thickness of 50 Å was then formed as the crystallization assisting layer 3 on the first dielectric layer 2 by sputtering with the aid of a target of Bi.

A recording layer 4 of Ge$_{17}$Te$_{55}$Sb$_{28}$ having a thickness of 225 Å was then formed on the crystallization assisting layer 3 by sputtering with the aid of a target of a Ge—Te—Sb alloy. A second dielectric layer 5 of ZnS—SiO$_2$ having a thickness of 200 Å, and a reflective layer 6 of an Al alloy having a thickness of 1500 Å were then sequentially formed by sputtering on the recording layer 4 in a manner similar to that in which the example 2-1 was produced. A UV cured resin layer 7 was then formed and set on the reflective layer 6 as in the example 2-1.

In the recording layer 4 of the phase change optical disk, the ratio x, y, and z of the respective quantities of the component elements Ge, Sb, and Te was Ge:Sb:Te=x:y:z= 0.17:0.28:0.55 where x+y+z=1, and satisfied the expressions (1)–(3) simultaneously.

EXAMPLE 2-5

A phase change optical disk having the same layer structure as the FIG. 1 was all produced in a manner similar to that in which the example 2-4 was produced, excluding formation of a layer of $Ge_{37}Te_{54}Sb_9$ having a thickness of 225 Å as the recording layer 4.

In the recording layer 4 of the phase change optical disk, the ratio x, y, and z of the respective quantities of the component elements Ge, Sb, and Te was Ge:Sb:Te=x:y:z= 0.37:0.09:0.54 where x+y+z=1, and satisfied the expressions (1)–(3) simultaneously.

EXAMPLE 2-6

A phase change optical disk having the same layer structure as the FIG. 1 was all produced in a manner similar to that in which the example 2-1 was produced, excluding that the thickness of the first dielectric layer 2 of ZnS—SiO$_2$ was 1200 Å; that the thickness of the crystallization assisting layer 3 of Sb layer was 100 Å; that the thickness of the recording layer 4 of a $Ge_2Te_5Sb_2$ alloy was 250 Å; that the thickness of the second dielectric layer 5 of ZnS—SiO$_2$ was 150 Å; and that the thickness of the reflective layer 6 of an Al alloy was 500 Å.

An X-ray diffraction sample A was produced which comprised respective layers formed on a smooth glass substrate with each of the respective layers being exactly the same in structure as a corresponding one of the layers of the last mentioned disk.

An X-ray diffraction sample B was also produced in a manner similar to that in which the sample A was produced, excluding that the thickness of a Sb layer as the crystallization assisting layer 3 having a thickness of 180 Å was formed on the smooth glass substrate and that no layers corresponding to the recording layer 4, reflective layer 6 and UV cured resin layer 7 were formed.

Comparative Example 2-2

A phase change optical disk was produced in a manner similar to that in which the example 2-6 was produced, excluding that no layer corresponding to the crystallization assisting layer 3 was formed.

An X-ray diffraction sample C was produced which comprises respective layers formed on a smooth glass substrate with each of the layers being exactly the same in structure as a corresponding one of the layers of the last-mentioned disk.

EXAMPLE 2-7

A phase change optical disk having the same layer structure as the FIG. 1 was all produced in a manner similar to that in which the example 2-4 was produced, excluding formation of a layer of $Ge_{43}Te_{52}Sb_4$ having a thickness of 225 Å as the recording layer 4.

In the recording layer 4 of the phase change optical disk, the ratio x, y, and z of the respective quantities of the component elements Ge, Sb, and Te was Ge:Sb:Te=x:y:z= 0.43 (=43/99):0.04 (=4/99):0.53 (=52/99) where x+y+z=1. The value of x was larger than an upper limit of the range of the expression (1) and the value of y was smaller than a lower limit of the range of the expression (2).

EXAMPLE 2-8

A phase change optical disk having the same layer structure as the FIG. 1 was all produced in a manner similar to that in which the example 2-4 was produced, excluding formation of a layer of $Ge_{25}Te_{40}Sb_{35}$ having a thickness of 225 Å as the recording layer 4.

In the recording layer 4 of the phase change optical disk, the ratio x, y, and z of the respective quantities of the component elements Ge, Sb, and Te was Ge:Sb:Te=x:y:z= 0.25:0.35:0.40 where x+y+z=1. The value of z was smaller than a lower limit of the range of the expression (3).

EXAMPLE 2-9

A phase change optical disk having the same layer structure as the FIG. 1 was all produced in a manner similar to that in which the example 2-4 was produced, excluding formation of a layer of $Ge_{25}Te_{32}Sb_{43}$ having a thickness of 225 Å as the recording layer 4.

In the recording layer 4 of the phase change optical disk, the ratio x, y, and z of the respective quantities of the component elements Ge, Sb, and Te was Ge:Sb:Te=x:y:z= 0.25:0.43:0.32 where x+y+z=1. The value of z was smaller than a lower limit of the range of the expression (3).

EXAMPLE 2-10

A phase change optical disk having the same layer structure as the FIG. 1 was all produced in a manner similar to that in which the example 2-4 was produced, excluding formation of a layer of $Ge_{20}Te_{67}Sb_{13}$ having a thickness of 225 Å as the recording layer 4.

In the recording layer 4 of the phase change optical disk, the ratio x, y, and z of the respective quantities of the component elements Ge, Sb, and Te was Ge:Sb:Te=x:y:z= 0.20:0.13:0.67 where x+y+z=1. The value of z is larger than an upper limit of the range of the expression (3).

Advantageous Effects Produced by the Crystallization Assisting Layer

The reflectivity and recording characteristics (CNR (Carrier to Noise Ratio) and erase ratio) of each of the optical disks of the examples 2-1 to 2-10 and comparative examples 2-1 and 2-2, thus obtained, were measured before its initialization. They were also measured after initialization.

The initialization was performed by irradiating the respective disks with a laser beam having wavelength of 680 nm, using "MO Disk Bulk Eraser LK101A" manufactured by K.K. Shibasoku. The measurement of the recording characteristics was performed as follows. First, a laser beam having a wavelength of 680 nm was modulated for each sample between an optimal peak power and an optimal bias power. Each optical disk sample which was rotating at 1800 rpm was irradiated with the modulated laser beam to perform initial recording with a first recording signal and the CNR was then measured. Next, the initial recording signal on the sample was overwritten by a recording signal different from the first recording signal, and an erase ratio of the initial recording signal was then measured.

In the samples of the examples 2-1 to 2-3, 2-8, 2-9 and the comparative example 2-1, the first and second recording signal frequencies were 1.08 and 3.89 MHz, respectively. In the samples of the examples 2-4 to 2-7, 2-10 and the comparative example 2-2, the first and second recording signal frequencies were 3.89 and 1.08 MHz, respectively.

The results of measurement of those characteristics are shown in Table 3 attached hereto. In the samples of the examples 2-8 to 2-10, the reflectivity of the initial records on each disk before the initialization was excessively low and the CNR and erase ratio could not be measured.

As will be seen from Table 3, the difference between before and after the initialization about the reflectivity, CNR and erase ratio of each of the samples of the examples 2-1 to 2-6 is small compared to the samples of the comparative examples 2-1 and 2-2 which include no crystallization assisting layer. It will be seen in each of the samples of the examples 2-1 to 2-6 that its recording layer has been crystallized by the related crystallization assisting layer and that its recording characteristics have been improved. It will be seen that especially in the examples 2-2 and 2-3 where the crystallization assisting layer was crystallized before the recording layer was formed, there is little difference between before and after the initialization about the reflectivity, CNR and erase ratio. Thus, it will be seen that the necessity for initialization process will be eliminated. In the samples of the examples 2-1 to 2-3, the especially preferable results that the CNR and the erase ratio were 53 and 25 dB or more, respectively, were obtained.

By comparison of the examples 2-3 to 2-5 and 2-7 to 2-10 which each comprise the Bi layer having the same thickness of 50 Å as the crystallization assisting layer but which are different in the composition of the recording layer, it will be seen that since the ratio x:y:z indicative of the composition of the recording layer of each of the samples of the examples 2-7 to 2-10 does not satisfy the expressions (1)–(3) simultaneously, the recording layer is difficult to crystallize and that the reflectivity before the initialization is very low compared to the examples 2-3 to 2-5.

Results of X-Ray Diffraction

The orientations of crystals of the crystallization assisting layers and recording layers of the X-ray diffraction samples A–C, produced as described above, were examined in the X-ray diffraction apparatus manufactured by K.K. Rigaku with a CuKα1 as the light source.

Since the crystal structure of the crystal phase of the phase change optical disk's recording layer (Ge—Sb—Te type) had a NaCl structure, the crystal structure of the recording layer was given an index representing the NaCl structure. Since Sb or Bi was used as the crystallization assisting layer material, the crystal structure of crystallization assisting layer was given an index representing a rhombohedral structure. Giving an index representing a rhombohederal structure was performed by converting the rhombohederal structure to a hexagonal lattice system, as is generally performed.

Figure 3:
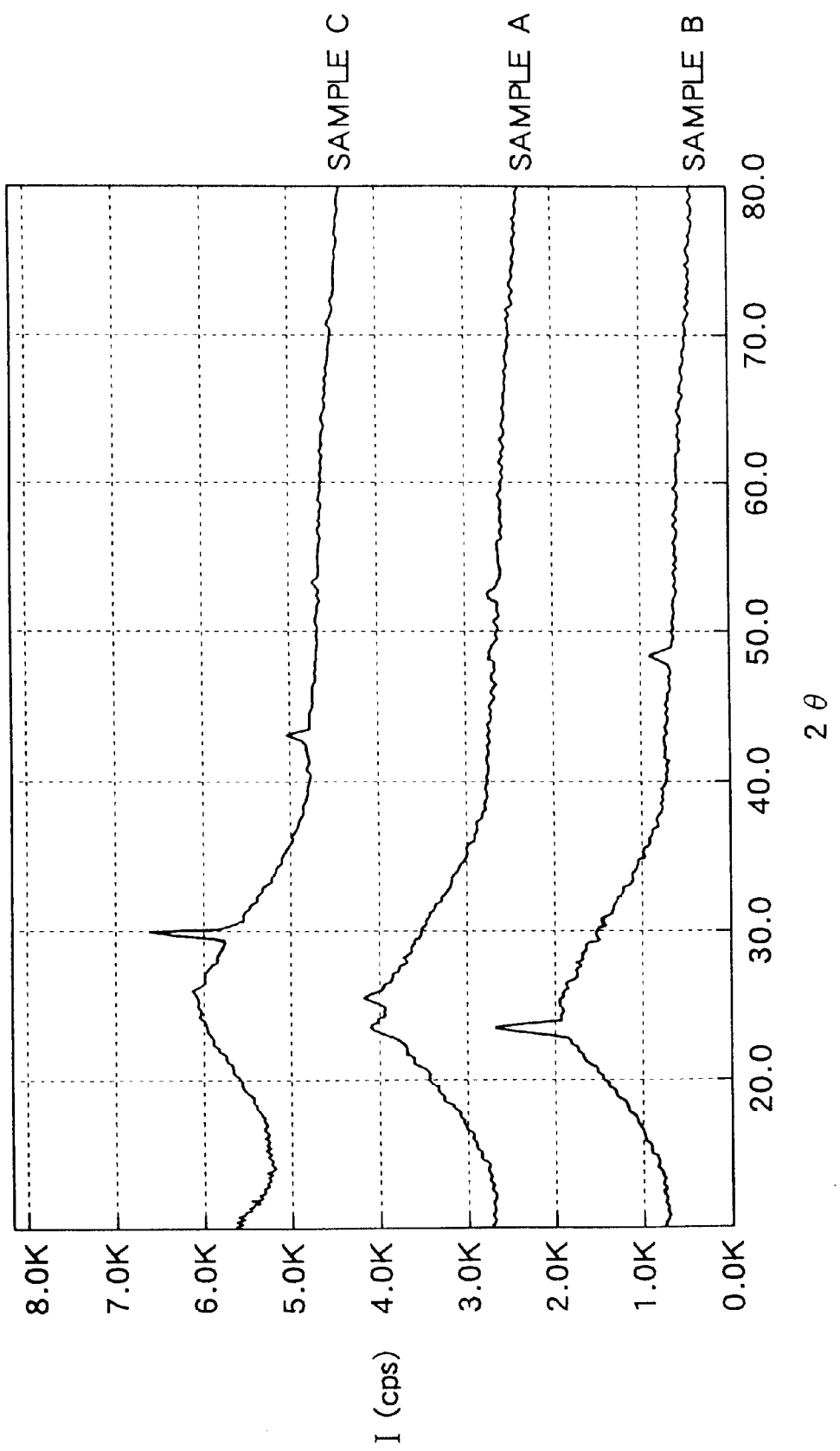
FIG. 3 is a graph of diffraction X-ray spectra obtained by X-ray diffraction from X-ray diffraction samples A–C of a second embodiment.

FIG. 3 is a chart of diffraction X-ray spectra where a vertical axis represents a diffraction intensity (I) and a horizontal axis a doubled value of a diffraction angle θ obtained from the respective samples A–C.

It was seen that when the sample C was directly subjected to X-ray diffraction, no diffraction peaks were observed and that its recording layer was amorphous. Thus, this sample was heated in an oven at a temperature of 275° C. for 10 minutes. Then, the resulting sample (new sample C) was again subjected to X-ray diffraction to obtain its spectra shown in FIG. 3.

It will be seen from this chart that the sample A (having its crystallization assisting layer provided immediately under the recording layer) exhibits peaks in (111), (222) and (003) at angles of 2θ=25.7, 52.9 and 23.7 degrees, respectively. It will be also seen that the sample B (including only the first dielectric layer and crystallization assisting layer) exhibits peaks in (003) and (006) at angles of 2θ=23.7 and 48.5 degrees, respectively. It will be further seen that the sample C (having exactly the same structure as the sample A, excluding that no crystallization assisting layer is provided) exhibits peaks in (200), (220) and (222) at angles of 2θ=29.7, 42.7 and 52.9 degrees, respectively.

Since the peaks in (111) (222) of the GeSbTe crystal appeared in the X-ray diffraction pattern of the sample A, it will be seen that the recording layer of the sample A was crystallized after its formation.

The orientation of Sb atoms which compose the crystallization assisting layer can be known from the chart of the sample B. More particularly, it will be known that powder Sb has high peak intensities in (012) and (104) whereas the Sb atoms of the Sb film formed on the first dielectric layer are oriented in (003) and (006) planes.

By comparing the samples A and C, it will be known that the orientations of their crystals differ depending on whether they include a crystallization assisting layer even when they have recording layers of the same composition and thickness. In this particular example, the presence of the crystallization assisting layer causes peaks in the (200) and (220) to disappear.

Third Embodiment

EXAMPLE 3-1

A phase change optical disk having the same layer structure as the FIG. 1 was produced as follows.

First, a first dielectric layer 2 having a thickness of about 100 nm was formed on a polycarbonate substrate 1 having a diameter of 90 mm and a thickness of 0.6 mm with a guide groove for a laser beam by RF sputtering with the aid of a target of ZnS—SiO$_2$. A Bi film having a thickness of 3 nm was then formed as the crystallization assisting layer 3 on the first dielectric layer 2 by sputtering with the aid of a target of Bi.

A recording layer 4 of Ge$_{20.3}$Te$_{56.7}$Sb$_{23.0}$ having a thickness of 20 nm was formed on the crystallization assisting layer 3 by sputtering with the aid of a target of a Ge—Te—Sb alloy. A second dielectric layer 5 having a thickness of 12 nm was then formed on the recording layer 4 by sputtering with the aid of a target of ZnS—SiO$_2$. A reflective layer 6 having a thickness of 70 nm was then formed on the second dielectric layer 5 by sputtering with the aid of a target of an Al alloy. A UV curable resin was then spin-coated on the reflective layer 6 to be set to thereby form a UV cured resin layer 7.

The recording characteristics of the optical disk, thus obtained, were measured without initialization as follows: First, a laser beam having a wavelength of 680 nm was modulated between a peak power of 12 mW and a bias power of 5 mW. The sample of the optical disk was rotated at a linear velocity of 6 m/s while being irradiated with the modulated laser beam to perform its initial recording and its CNR was measured. The recording frequency was 5 MHz and the read power was 1 mW. The CNRs of records on the optical disks were measured after the two, three and four overwriting or recording operations.

The CNRs measured after the one, two, three and four overwriting or recording operations were 49.7, 48.8, 48.7 and 48.3 dB, respectively. It will be seen that the CNR decreased by 0.9 dB after the two recording operations.

Figure 4:
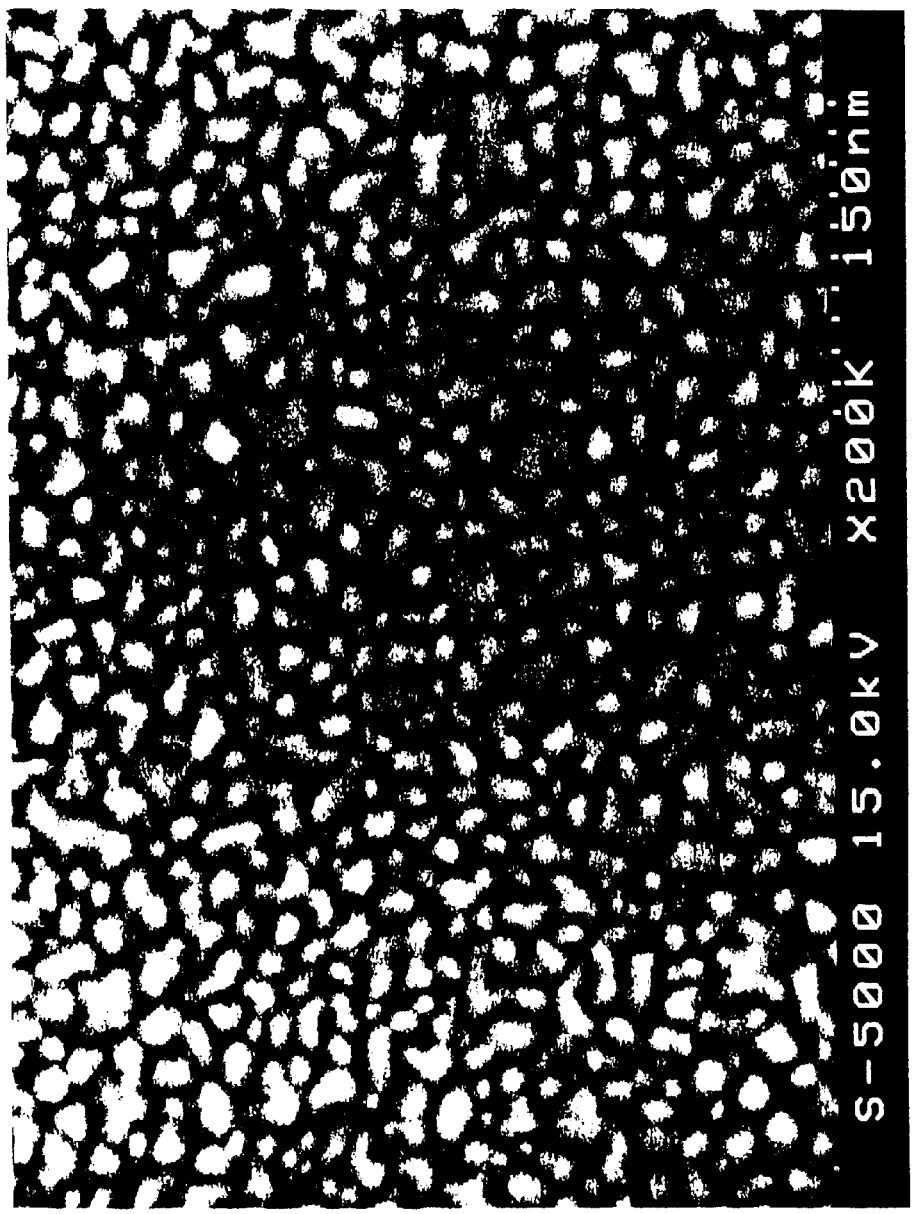
FIG. 4 is a photograph of a thin layer corresponding to a crystallization assisting layer of an example 3-1.

The state of the sample present after the formation of its crystallization assisting layer 3 and before the formation of its recording layer 4 was observed with the aid of a high resolution SEM (UHRSEM which was HITACHI S-5000 produced by Hitachi Seisakusho) at an acceleration voltage of 15 kV. A photograph of its reflective electron image is shown in FIG. 4.

It will be seen from this photograph that the crystallization assisting layer 3 is in the form of a discontinuous island-like film in which most of the islands have a length of 8–40 nm with the longest one being 70 nm. The interval between the islands was 20 nm at a maximum. Measurement by an atomic force microscope (AFM: Topo Metrix TMX-2000) in a contact mode clarified that an average thickness of the islands was 2.04 nm.

EXAMPLE 3-2

A phase change optical disk having the same layer structure as the FIG. 1 was produced in a manner similar to that in which the example 3-1 was produced, excluding that a Bi layer having a thickness of about 1.5 nm was formed as the crystallization assisting layer 3.

The recording characteristics of the optical disk, thus obtained, were measured without initialization as in the example 3-1. The CNRs measured after the one, two, three and four overwriting or recording operations were 51.7, 52.1, 51.8 and 52.0 dB, respectively. It will be seen that no decrease occurred in the CNR after the two recording operations or more.

Figure 5:
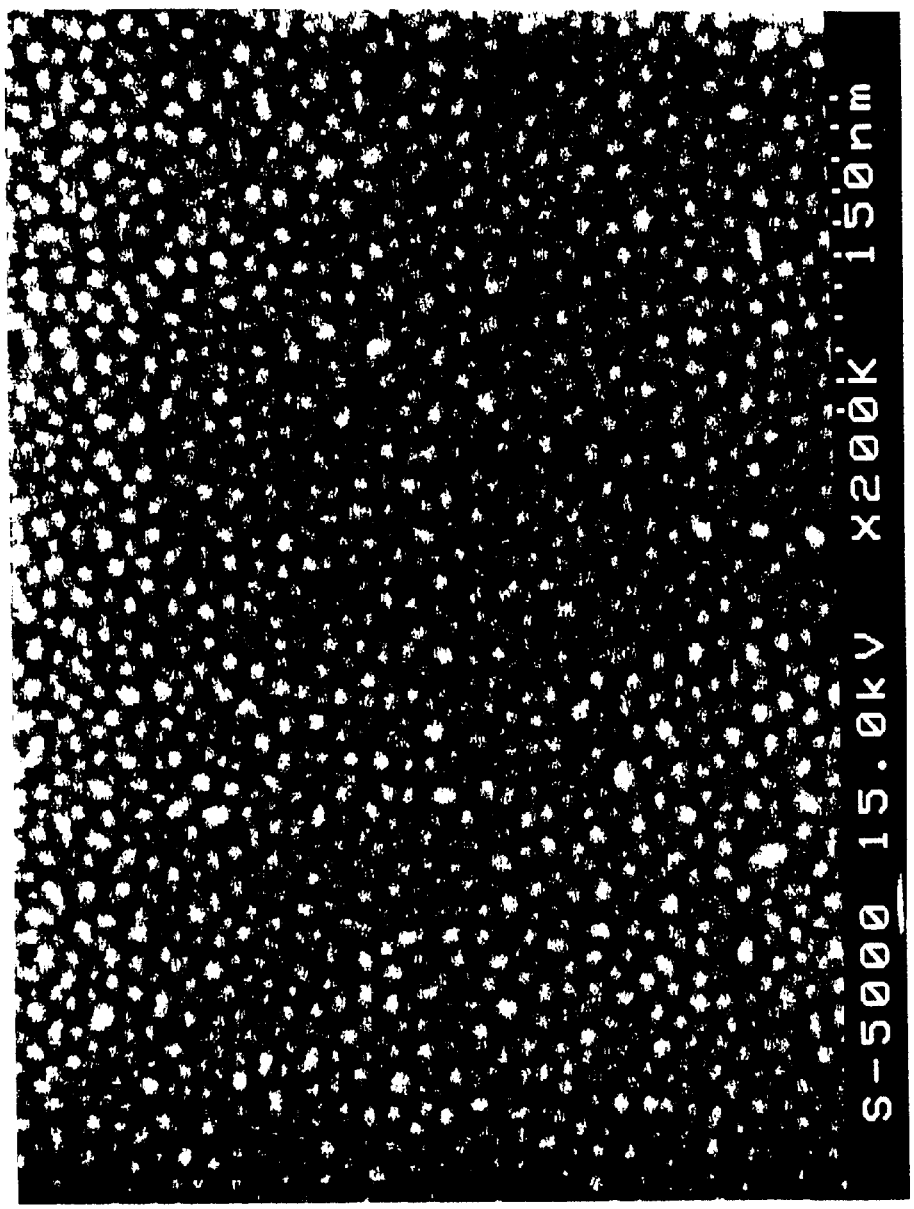
FIG. 5 is a photograph of a thin layer corresponding to a crystallization assisting layer of an example 3-2.

The state of the sample present after the formation of its crystallization assisting layer 3 and before the formation of its recording layer 4 was observed with the aid of the high resolution SEM in a manner similar to that performed in the Example 3-1. A photograph of its reflective electron image is shown in FIG. 5.

It will be seen from this photograph that the crystallization assisting layer 3 is in the form of a discontinuous island-like film in which most of the islands have a length of 4–20 nm with the longest one being 25 nm and that the interval between the islands was 13 nm at a maximum. Measurement similar to that of the Example 3-1 in a contact mode clarified that an average thickness of the islands was 1.73 nm.

EXAMPLE 3-3

A phase change optical disk having the same layer structure as the FIG. 1 was produced in a manner similar to that in which the example 3-1 was produced, excluding that a Bi layer having a thickness of about 0.65 nm was formed as the crystallization assisting layer 3.

The measurement of the recording characteristics of the uninitialized optical disk, thus obtained, clarified that its CNR was 50.8 dB after recorded first time, 51.1 dB after recorded twice, 51.3 dB after recorded three times, and 51.3 dB after recorded four times. That is, no decrease in the CNR occurred after recorded twice or more.

EXAMPLE 3-4

A phase change optical disk having the same layer structure as the FIG. 1 was produced in a manner similar to that in which the example 3-1 was produced, excluding that a Bi layer having a thickness of about 0.3 nm was formed as the crystallization assisting layer 3.

The measurement of the recording characteristics of the uninitialized optical disk, thus obtained, clarified that its CNR was 54.0 dB after recorded first time, 54.1 dB after recorded twice, 53.9 dB after recorded three times, and 54.2 dB after recorded four times. That is, no decrease in the CNR occurred after recorded twice or more.

Although the state of this sample present after the formation of its crystallization assisting layer 3 and before the formation of the recording layer 4 was observed with the aid of the high-resolution SEM as in the example 3-1, no island-like objects could not be recognized. Since the resolution of this device was 0.7 nm, it was considered that the size of the island-like objects as the crystallization assisting layer 3 was less than 0.7 nm. An average thickness of the island-like objects was measured as 1.01 nm in a manner similar to that used in the example 3-1.

EXAMPLE 3-5

A phase change optical disk having the same layer structure as the FIG. 1 was produced in a manner similar to that in which the example 3-1 was produced, excluding that the first dielectric layer 2 had a thickness of 115 nm, that the crystallization assisting layer 3 of Bi had a thickness of 1.5 nm, that the recording layer 4 comprised a $Ge_{22.1}Te_{56.4}Sb_{21.5}$ layer having a thickness of 22 nm, and that the reflective layer 6 of an Al alloy had a thickness of 50 nm.

The measurement of the recording characteristics of the uninitialized optical disk, thus obtained, performed in a manner similar to that performed for the example 3-1, clarified that its CNR was 53.2 dB after recorded first time, 53.3 dB after recorded twice, 53.2 dB after recorded three times, and 53.2 dB after recorded four times. That is, no decrease in the CNR occurred after recorded twice or more.

EXAMPLE 3-6

A phase change optical disk having the same layer structure as the FIG. 1 was produced in a manner similar to that in which the example 3-1 was produced, excluding that a Bi layer having a thickness of about 5.0 nm was formed as the crystallization assisting layer 3.

The measurement of the recording characteristics of the uninitialized optical disk, thus obtained, clarified that its CNR was 50.7 dB after recorded first time, 47.5 dB after recorded twice, 47.9 dB after recorded three times, and 47.2 dB after recorded four times. That is, a decrease 3.2 dB in the CNR occurred after recorded twice.

When the state of this sample present after the formation of its crystallization assisting layer 3 and before the formation of the recording layer 4 was observed with the aid of the high-resolution SEM as in the example 3-1, it was found that the crystallization assisting layer 3 was formed in a continuous film.

Advantageous Effects Produced by the Crystallization Assisting Layer

It will be seen from the results of the examples 3-1 to 3-6 that when the crystallization assisting layer 3 of Bi was formed as a discontinuous island-like film, the necessity for the initialization process for crystallizing the recording layer formed on the crystallization assisting layer 3 was eliminated, and that the CNRs measured after the two or more recording operations by overwriting were not lower than that measured in the initial recording operation.

It will also be known that the crystallization assisting layer 3 of Bi was formed so as to have a thickness of less than 3 nm to thereby provide a discontinuous island-like film by general sputtering (when the sputtering conditions were: for example, the sputtering gas was Ar, the sputtering pressure was 0.5 Pa, and the power consumed was DC 10 W).

When the length of the island-like crystallization assisting layer is less than 100 nm, its discontinuous island-like film is easily obtained by general sputtering which lacks patterning, for example. For the island-like crystallization assisting layer 3, preferably, its length is less than 80 nm, and the maximum gap between two adjacent islands is less than 50 nm.

Crystal Structures of the Recording Layer and Crystallization Assisting Layer

An X-ray diffraction sample A was produced having the same layer structure as the example 3-5, excluding that no UV cured resin layer 7 was formed on its cover glass.

An X-ray diffraction sample B was produced having the same layer structure as the sample A, excluding that no crystallization assisting layer 3 was formed.

An X-ray diffraction sample C was produced having the same layer structure as the sample A, excluding that the recording layer 4 had a composition of $Ge_{18.7}Sb_{26.9}Te_{54.4}$.

An X-ray diffraction sample D was produced having the same layer structure as the sample A, excluding that the recording layer 4 had a composition of $Ge_{26.4}Sb_{17.6}Te_{56.0}$.

An X-ray diffraction sample E was produced having the same layer structure as the sample A, excluding that the recording layer 4 had a composition of $Ge_{30.8}Sb_{12.9}Te_{56.3}$.

An X-ray diffraction sample F was produced having the same layer structure as the sample A, excluding that the recording layer 4 had a composition of $Ge_{36.5}Sb_{9.3}Te_{54.2}$.

An X-ray diffraction sample G was produced having the same layer structure as the sample A, excluding that the recording layer 4 had a composition of $Ge_{49.7}Te_{51.3}$.

Since the samples A, C–F each had a discontinuous island-like film of Bi as the crystallization assisting layer 3, its recording layer 4 was crystallized by the crystallization assisting layer 3. Since the sample B lacked the crystallization assisting layer 3, its recording layer 4 had not been crystallized. Thus, the sample B was heated at 275° C. for 10 minutes in an oven to crystallize the recording layer. The sample B, thus obtained, was subjected to X-ray diffraction. The sample G had the crystallization assisting layer 3, but its recording layer 4 was not crystallized immediately after its formation.

Those X-ray diffraction samples A–G were each put on the X-ray diffraction apparatus to examine the orientation of the crystals of the crystallization assisting layer and the recording layer. In this case, the X-ray diffraction apparatus produced by K.K. Rigaku, and CuKα1 as the light source were used. Since the crystal structure of the phase change optical disk recording layer (Ge—Sb—Te) in its crystalline phase was a NaCl structure, the crystal structure of the recording layer was regarded as having the NaCl structure and given a corresponding index.

Figure 6:
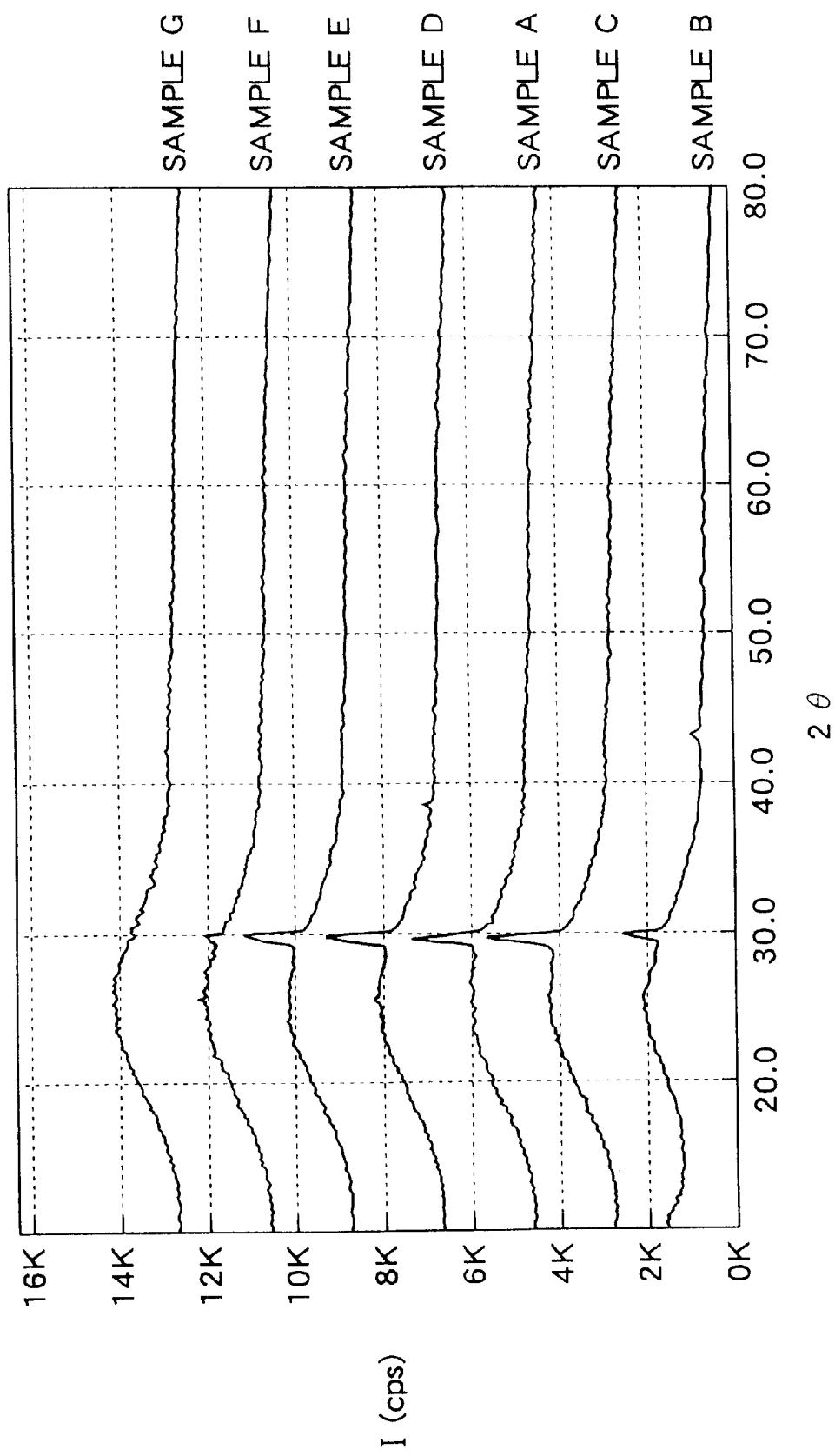
FIG. 6 is a graph of diffraction X-ray spectra obtained by X-ray diffraction from X-ray diffraction samples A–G of a third embodiment.

FIG. 6 is a chart of the diffraction X-ray spectra of the respective samples A–G where the vertical axis represents a diffraction intensity (I) and the horizontal axis a doubled value of the diffraction angle θ.

It will be seen from this chart that the samples A–F exhibit peaks in (200) at 2θ=29.7 degrees whereas the sample G has no such peak. The intensity of the peak tends to decrease as the Ge content of the recording layer increases and its Sb content decreases.

The sample B has peaks in (220) and (222) at 2θ=42.7 and 52.9 degrees, respectively, in addition to the peak in (200) at 2θ=29.7. This is considered to be due to the sample B lacking a crystallization assisting layer 3. It will be seen that by forming a discontinuous island-like film of Bi as the crystallization assisting layer 3 and further forming a recording layer 4 of Ge—Sb—Te on the crystallization assisting layer 3, the crystals of the recording layer 4 is easily oriented strongly in a surface (200) alone.

Fourth Embodiment

EXAMPLE 4-1

A phase change optical disk having the same layer structure as the FIG. 1 was produced as follows.

First, a first dielectric layer 2 having a thickness of about 100 nm was formed on a polycarbonate substrate 1 having a diameter of 90 mm and a thickness of 0.6 mm with a guide groove for a laser beam and irregularities for address signals by RF sputtering with the aid of a target of ZnS—$SiO_2$. A Bi layer having a thickness of 1.5 nm was then formed as the crystallization assisting layer 3 on the first dielectric layer 2.

A recording layer 4 of $Ge_{23}Te_{54}Sb_{23}$ having a thickness of 23 nm was formed on the crystallization assisting layer 3. The temperature of the substrate 1 was 35° C. before the formation of the recording layer 4 during which the temperature of the substrate 1 did not rise. A second dielectric layer 5 of ZnS—$SiO_2$ having a thickness of 20 nm and a reflective layer 6 of Al alloy having a thickness of 150 nm were then formed sequentially on the recording layer 4 by sputtering. A UV curable resin was then spin-coated on the reflective layer 6 and set to thereby form a UV cured resin layer 7.

EXAMPLE 4-2

A phase change optical disk having the same layer structure as the FIG. 1 was produced in a manner similar to that in which the example 4-1 was produced, excluding that after the crystallization assisting layer 3 was formed, the substrate 1 was irradiated with light from a halogen lamp to heat the substrate up to 75° C., and that the recording layer 4 was then formed immediately. The temperature of the substrate was maintained in a range of from 45 through 75° C. inclusive during the formation of the recording layer 4.

EXAMPLE 4-3

A phase change optical disk having the same layer structure as the FIG. 1 was produced in a manner similar to that in which the example 4-1 was produced, excluding that after the crystallization assisting layer 3 was formed, the substrate 1 was heated up to 55° C. with a heater. The temperature of the substrate was maintained in a range of from 45 through 55° C. inclusive during the formation of the recording layer 4.

EXAMPLE 4-4

A phase change optical disk having the same layer structure as the FIG. 1 was produced, excluding that immediately after the disk was formed up to the crystallization assisting layer 3 in a manner similar to that in which the example 4-1 was produced, a recording layer 4 of $Ge_{21}Te_{54}Sb_{25}$ alloy having a thickness of 23 nm was formed, that the temperature of the substrate was 45° C. immediately after the formation of the crystallization assisting layer 3, and that the temperature of the substrate was maintained 45° C. during the formation of the recording layer 4. The other conditions were all identical to those of the example 4-1.

EXAMPLE 4-5

A phase change optical disk having the same layer structure as the FIG. 1 was produced in a manner similar to that in which the example 4-1 was produced, excluding that after the formation of the crystallization assisting layer 3 the substrate 1 was irradiated with light from a halogen lamp to heat the substrate up to 115° C., and that a recording layer 4 of $Ge_{23}Te_{53}Sb_{24}$ alloy having a thickness of 23 nm was then formed immediately.

Effects Produced by the Heating of the Substrate when the Recording Layer was Formed The reflectivity and recording characteristics (CNR and erase ratio) of each of the optical disks of the examples 4-1 to 4-5, thus obtained, before the initialization were measured.

The reflectivity of each optical disk was measured, using a laser having a wavelength of 680 nm immediately after the disk was obtained as such and after its accelerating test was performed (in which the disk was held within a tank of a humidity of 90% at a temperature of 80° C. for 300 hours).

The recording characteristics of each disk were measured as follows. First, the laser beam having a wavelength of 680 nm was modulated between an optimal peak power and an optimal bias power for each sample. By irradiating the optical disk sample which was rotating at 1800 rpm with the modulated laser beam, it was subjected to initial recording (its recording frequency was 1.08 MHz), and then its CNR was measured.

Then, the initial recording signal recorded on the disk was overwritten by a recording signal (having a frequency of 3.89 MHz) different from the initial recording signal (having a frequency of 1.08 MHz), and then the erase ratio of the initial recording signal was measured.

Those results are together shown in Table 4, attached hereto, on which numerical values appearing on the right of respective arrows in the reflectivity column are obtained immediately after the acceleration test. The optical disk of the example 4-5 was measured by the measuring device, but address signals could not be read well in many places, and cannot be used.

As will be seen from Table 4, the reflectivitys of the optical disks of the examples 4-2 to 4-4 whose recording layers were formed at a substrate temperature in a range of from 45 through 110° C. inclusive were not substantially changed by the acceleration test. In comparative examples, the optical disks of the example 4-1 whose recording layer was formed at a substrate temperature of 35° C. was insufficiently crystallized. Thus, changes in its reflectivity due to the acceleration test were found. The erase ratio of the optical disks of the examples 4-2 to 4-4 were satisfactory compared to the optical disk of the example 4-1.

As will be known from the above, in this embodiment, when the optical disks whose recording layer were formed at a substrate temperature in a range of from 45° C. through a substrate deforming temperature inclusive were used without the initialization process, those optical disks exhibited stabilized characteristics compared to those disks whose recording layers were formed at a substrate temperature of 35° C. In many cases, however, even when the recording layers were formed at a substrate temperature of less than 45° C., the recording layers were sufficiently crystallized to thereby provide stabilized characteristics.

Fifth Embodiment

EXAMPLE 5-1

A phase change optical disk having the same layer structure as the FIG. 1 was produced as follows.

First, a first dielectric layer 2 having a thickness of about 80 nm was formed on a polycarbonate substrate 1 having a diameter of 120 mm and a thickness of 0.6 mm with a guide groove for a laser beam by RF sputtering with the aid of a target of ZnS—$SiO_2$. A Bi layer having a thickness of 1.5 nm was then formed as the crystallization assisting layer 3 on the first dielectric layer 2 by sputtering with the aid of a target of Bi.

A recording layer 4 of $Ge_{23}Te_{54}Sb_{23}$ having a thickness of 22 nm was formed on the crystallization assisting layer 3 by sputtering with the aid of a target of a Ge—Te—Sb alloy. A second dielectric layer 5 having a thickness of 12 nm was then formed on the recording layer 4 by sputtering with the aid of a target of ZnS—$SiO_2$. A reflective layer 6 having a thickness of 100 nm was then formed on the second dielectric layer 5 by sputtering with the aid of a target of an Al alloy. A UV curable resin was then spin-coated on the reflective layer 6 and set to thereby form a UV cured resin layer 7.

During the formation of the recording layer 4, the temperature of the substrate was maintained at 85° C. The first dielectric layer 2, crystallization assisting layer 3, recording layer 4, second dielectric layer 5 and reflective layer 6 were all formed within an atmosphere of an argon gas.

EXAMPLE 5-2

A phase change optical disk having the same layer structure as the FIG. 1 was produced in a manner similar to that in which the example 5-1 was produced, excluding that the crystallization assisting layer 3 was formed within an atmosphere of an argon gas plus a nitrogen gas of 4 volume %.

EXAMPLE 5-3

A phase change optical disk having the same layer structure as the FIG. 1 was produced in a manner similar to that in which the example 5-1 was produced, excluding that the crystallization assisting layer 3 was formed within an atmosphere of an argon gas plus a nitrogen gas of 8 volume %,.

EXAMPLE 5-4

A phase change optical disk having the same layer structure as the FIG. 1 was produced in a manner similar to that in which the example 5-1 was produced, excluding that the crystallization assisting layer 3 was formed within an atmosphere of an argon gas plus a nitrogen gas of 16 volume %.

EXAMPLE 5-5

A phase change optical disk having the same layer structure as the FIG. 1 was produced in a manner similar to that in which the example 5-1 was produced, excluding that the crystallization assisting layer 3 was formed within an atmosphere of an argon gas plus a nitrogen gas of 24 volume %.

EXAMPLE 5-6

A phase change optical disk having the same layer structure as the FIG. 1 was produced in a manner similar to that in which the example 5-1 was produced, excluding that the crystallization assisting layer 3 was formed within an atmosphere of an argon gas plus a nitrogen gas of 32 volume %.

Effects Produced by Addition of Nitrogen to the Crystallization Assisting Layer

The reflectivitys and recording characteristics of each of the optical disks of the examples 5-1 to 5-6 were measured before its initialization. First, the laser beam having a wavelength of 680 nm was modulated between a peak power of 11 mW and a bias power of 5 mW depending on the recording signal. By irradiating the optical disk sample rotating at a linear velocity of 6 m/s with the modulated laser beam, the initial recording was performed. The resulting records on the disk sample were read and its reflectivity and jitter were then measured.

Next, the disk was overwritten by a recording signal, which produced records identical to the initial ones, 10, 1000, 20000, 30000, 50000, and 100000 times, the respective records were read, and then the corresponding jitters were measured. The results of those measurements are together shown on Table 5 attached hereto.

As will be seen from Table 5, the optical disks of the examples 5-2 to 5-6 whose crystallization assisting layers were formed within the atmosphere containing a nitrogen gas were low in jitter value compared to the optical disk of the example 5-1 example whose crystallization assisting layer was formed within a nitrogen gas-free atmosphere, when the overwriting was performed repeatedly 20,000 times or more. The optical disks of the examples 5-2 to 5-6 are excellent in overwrite cyclability compared to the optical disk of the example 5-1.

The crystallization assisting layer formed within the atmosphere containing the nitrogen gas contains nitrogen, which is considered to improve the overwrite cyclability.

The reason why the overwrite cyclability of the disks are improved due to nitrogen being contained in the crystallization assisting layer can be presumed as follows. The nitrogen contained in the crystallization assisting layer gradually exudes out into the recording layer as the recording/erasing operations are repeated to change the recording layer present in the crystal state to a finer-crystal layer, to increase the viscosity of the recording layer present in the crystal state and to increase the crystallizing temperature of the recording layer. Especially, it is considered that nitrides which will be formed on the interface due to the changing of the recording layer to the finer-crystal layer restrains the recording layer from partially thinning due to movement of materials of the recording layer (flow of the materials of the recording layer in its direction of rotation during melting).

As a quantity of nitrogen contained in the crystallization assisting layer increases, the overwrite cyclability improve. If the quantity of nitrogen increases excessively, the crystallization becomes insufficient to thereby decrease the reflectivity. It is to be noted that since 15.5 and 15.2% of the reflectivitys of the examples 5-5 and 5-6 are in an a usable range, there are no problems. The optical disks of the examples 5-5 and 5-6 where the content of a nitrogen gas in the layer forming atmosphere was high have high jitter values compared to other optical disks after the recording was performed 1,000 times, but are less than 15%, which is considered as not raising any questions practically.

Joint MORIS (Magneto-Optical Recording International Symposium/ISOM (International Symposium on Optical Memory) '97 Technical Digest p.292 reported that addition of nitrogen to the recording layer greatly improved the overwrite cyclability.

The present invention is intended to eliminate the necessity for the initialization process by providing a crystallization assisting layer on an optical information recording medium to crystallize the recording layer when the same is formed. When the recording layer of the optical information recording medium having such crystallization assisting layer contains nitrogen, the recording layer cannot be crystallized when formed.

Actually, a phase change optical disk having the same layer structure as the FIG. 1 was produced in an manner similar to that in which the example 5-1 was produced, excluding that the recording layer 4 was formed within an atmosphere which contained an argon gas plus a nitrogen gas of 4 volume %. The reflectivity of the disk measured before its initialization was 4.3%, and the recording layer was not be crystallized.

As described above, in an optical information recording medium having a crystallization assisting layer, the necessity for the initialization process is eliminated and the overwrite cyclability are improved by adding nitrogen to the crystallization assisting layer without adding nitrogen to the recording layer.

Sixth Embodiment

EXAMPLE 6-1

A phase change optical disk having the same layer structure as the FIG. 1 was produced in a manner similar to that in which the example 5-4 of the fifth embodiment was produced, excluding that the first dielectric layer 2 was formed within an atmosphere which contained an argon gas and an oxygen gas of 0.1 volume %.

EXAMPLE 6-2

A phase change optical disk having the same layer structure as the FIG. 1 was produced in a manner similar to that in which the example 5-4 of the fifth embodiment was produced, excluding that the first dielectric layer 2 was formed within an atmosphere which contained an argon gas and a nitrogen gas of 0.5 volume %.

EXAMPLE 6-3

A phase change optical disk having the same layer structure as the FIG. 1 was produced in a manner similar to that in which the example 5-4 of the fifth embodiment was produced, excluding that the second dielectric layer 5 was formed within an atmosphere which contained an argon gas and an oxygen gas of 0.1 volume %.

EXAMPLE 6-4

A phase change optical disk having the same layer structure as the FIG. 1 was produced in a manner similar to that in which the example 5-4 of the fifth embodiment was produced, excluding that the second dielectric layer 5 was formed within an atmosphere which contained an argon gas and a nitrogen gas of 0.5 volume %.

Effects Produced by Addition of Oxygen or Nitrogen to the Dielectric Layer

The reflectivitys and recording characteristics of the respective optical disks of the examples 6-1 to 6-4 before their initialization were measured in a manner similar to that used for the fifth embodiment. The results of those measurements are together shown in Table 6, attached hereto, which also contains the results of the measurement of the example 5-4 of the fifth embodiment for the sake of comparison.

As will be seen from Table 6, attached hereto, the jitter values of the optical disks of the examples 6-1 to 6-4 which contain nitrogen in their crystallization assisting layer 3 as well as oxygen or nitrogen in their first or second dielectric layer are restricted to small ones compared to the optical disk of the example 5-4 which contains only nitrogen in its crystallization assisting layer 3.

It will be seen that especially when the number of the overwriting is large (for example, after recorded 100,000 times), the difference in jitter between each of the disks of the examples 6-1 to 6-4 and a respective one of the optical disk of the example 5-4 is large, and that the overwrite cyclability of the disks are further improved by incorporating oxygen or nitrogen into the first or second dielectric layer.

INDUSTRIAL APPLICABILITY

As described above, in an optical information recording medium obtained by the inventive making method, the recording layer becomes crystallized immediately after its formation due to the existence of the crystallization assisting layer of predetermined materials. Thus, the necessity for the initialization process required in the past is eliminated. As a result, the process for making the optical information recording medium is simplified and the cost is reduced.

Especially, by forming the crystallization assisting layer in the form of a discontinuous island-like film of materials which comprise bismuth (Bi) and/or bismuth (Bi) compounds, an optical information recording medium having stabilized recording characteristics is obtained.

An optical information recording medium excellent in overwrite cyclability is obtained which eliminates the necessity for the initialization process by incorporating nitrogen into the crystallization assisting layer.

TABLE 1

| | material & thickness | crystal structure | B-value | lattice unconformity |
|---|---|---|---|---|
| Example 1-1 | PbTe 10 Å | face-centered cubic lattice system NaCl type | 4.5637 Å <110> direction | 5.519% |
| Example 1-2 | PbTe 50 Å | as above | as above | as above |
| Example 1-3 | Bi$_2$Te$_3$ 10 Å | face-centered cubic lattice system Bi$_2$Te$_3$ type | 4.2931 Å <110> direction | −0.738% |
| Example 1-4 | Bi$_2$Te$_3$ 50 Å | as above | as above | as above |
| Comp. Ex. 1-1 | no crystallization assisted layer | — | — | — |
| Comp. Ex. 1-2 | W 10 Å | body-centered cubic lattice system, body-centered cubic lattice | 3.1653 Å <100> direction | −26.8% |
| Comp. Ex. 1-3 | Te 30 Å | hexagonal system selenium type | 4.4579 Å a-axial direction | 3.07% |
| Comp. Ex. 1-4 | Sb$_2$TeSe$_2$ 30 Å | rhombohederal lattice system | 4.121 Å | −4.717% |
| Comp. Ex. 1-5 | Sb$_2$Te$_3$ 30 Å | rhombohederal lattice system | 4.2463 Å | −1.809% |
| Comp. Ex. 1-6 | Ag$_2$Te 30 Å | monoclinic system | 4.48 Å | 3.58% |
| Comp. Ex. 1-7 | CrTe 30 Å | hexagonal system | 3.98 Å | −9.13% |

TABLE 2

| | initialization | reflectivity (%) | CNR (dB) once/100 times | erase ratio (dB) once/100 times |
|---|---|---|---|---|
| Example 1-1 | before | 18 | 50/51 | 22/24 |
| | after | 20 | 52/52 | 23/24 |
| Example 1-2 | before | 21 | 53/53 | 27/30 |
| | after | 22 | 53/53 | 31/31 |
| Example 1-3 | before | 18 | 49/50 | 28/30 |
| | after | 21 | 52/52 | 30/30 |
| Example 1-4 | before | 21 | 50/50 | 29/29 |
| | after | 22 | 53/53 | 30/30 |
| Comp. Ex. 1-1 | before | 5 | 36/49 | 7/29 |
| | after | 20 | 53/53 | 30/30 |
| Comp. Ex. 1-2 | before | 6 | 33/49 | 7/28 |
| | after | 22 | 50/50 | 29/29 |
| Comp. Ex. 1-3 | before | 9 | 33/50 | 8/30 |
| | after | 21 | 51/52 | 30/30 |
| Comp. Ex. 1-4 | before | 12 | 39/42 | 6/23 |
| | after | 21 | 50/43 | 22/23 |
| Comp. Ex. 1-5 | before | 9 | 50/51 | 20/20 |
| | after | 18 | 50/51 | 21/20 |
| Comp. Ex. 1-6 | before | 8 | 38/46 | 6/22 |
| | after | 19 | 50/51 | 20/21 |
| Comp. Ex. 1-7 | before | 7 | 32/42 | 9/18 |
| | after | 18 | 48/47 | 18/17 |

TABLE 3

| | initialization | reflectivity | CNR (dB) | erase ratio (dB) |
|---|---|---|---|---|
| Example 2-1 | before | 19 | 53 | 32 |
| | after | 22 | 54 | 34 |
| Comp. Ex. 2-1 | before | 6 | 35 | 5 |
| | after | 21 | 53 | 35 |
| Example 2-2 | before | 20 | 53 | 27 |
| | after | 21 | 54 | 27 |
| Example 2-3 | before | 20 | 54 | 32 |
| | after | 22 | 54 | 33 |
| Example 2-4 | before | 22 | 49 | 25 |
| | after | 23 | 53 | 27 |
| Example 2-5 | before | 12 | 46 | 20 |
| | after | 18 | 50 | 23 |
| Example 2-6 | before | 17 | 52 | 25 |
| | after | 18 | 56 | 27 |
| Comp. Ex. 2-2 | before | 5 | 45 | 17 |
| | after | 17 | 53 | 25 |
| Example 2-7 | before | 6 | 40 | 12 |
| | after | 17 | 47 | 17 |
| Example 2-8 | before | 4 | unmeasurable | unmeasurable |
| | after | 15 | unmeasured | unmeasured |
| Example 2-9 | before | 4 | unmeasurable | unmeasurable |
| | after | 13 | unmeasured | unmeasured |
| Example 2-10 | before | 4 | unmeasurable | unmeasurable |
| | after | 12 | unmeasured | unmeasured |

TABLE 4

| | reflectivity (%) | CNR (dB) | erase ratio (dB) |
|---|---|---|---|
| example 4-1 | 12 → 18 | 52 | 29 |
| example 4-2 | 19 → 20 | 53 | 32 |
| example 4-3 | 20 → 21 | 53 | 33 |
| example 4-4 | 20 → 21 | 54 | 32 |

TABLE 5

| | addition of $N_2$ in film formation | reflectivity (%) | jitter (%) after recorded | | | | | | |
|---|---|---|---|---|---|---|---|---|---|
| | | | once | 10 times | 1,000 times | 20,000 times | 30,000 times | 50,000 times | 100,000 times |
| example 5-1 | none | 18.3 | 5.6 | 6.9 | 7.8 | 12.2 | 18.5 | 28.8 | 28.6 |
| example 5-2 | 4 vol % | 18.7 | 5.7 | 7.2 | 7.8 | 11.1 | 14.5 | 23.2 | 28.1 |
| example 5-3 | 8 vol % | 19.2 | 5.8 | 7.4 | 7.8 | 9.2 | 12.1 | 18.7 | 22.7 |
| example 5-4 | 16 vol % | 18.6 | 6.3 | 7.5 | 8.3 | 8.8 | 11.1 | 11.9 | 16.9 |
| example 5-5 | 24 vol % | 15.5 | 7.5 | 7.5 | 10.0 | 8.5 | 9.1 | 10.1 | 14.5 |
| example 5-6 | 32 vol % | 15.2 | 7.5 | 7.7 | 10.6 | 8.9 | 9.3 | 10.2 | 13.2 |

TABLE 6

| | addition of $N_2$ or $O_2$ dielectric layer formation | reflectivity (%) | jitter (%) after recorded | | | | | | |
|---|---|---|---|---|---|---|---|---|---|
| | | | once | 10 times | 1,000 times | 20,000 times | 30,000 times | 50,000 times | 100,000 times |
| example 6-1 | 1st dielectric layer $O_2$ 0.1 vol % | 16.6 | 6.1 | 6.8 | 8.0 | 9.6 | 10.0 | 10.2 | 12.4 |
| example 6-2 | 1st dielectric layer $N_2$ 0.5 vol % | 17.2 | 6.0 | 7.1 | 7.8 | 9.0 | 10.3 | 11.3 | 12.9 |
| example 6-3 | 2nd dielectric layer $O_2$ 0.1 vol % | 17.6 | 6.2 | 7.6 | 7.9 | 8.8 | 11.2 | 11.3 | 13.2 |
| example 6-4 | 1st dielectric layer $N_2$ 0.5 vol % | 16.9 | 6.4 | 7.7 | 7.9 | 9.0 | 10.2 | 11.9 | 12.3 |
| example 5-4 | no addition to dielectric layer | 18.6 | 6.3 | 7.5 | 8.3 | 8.8 | 11.1 | 11.9 | 16.9 |

What is claimed is:

1. A method for producing an optical information recording medium having a recording layer of materials whose main components comprise germanium (Ge), antimony (Sb) and tellurium (Te) on one side of a substrate comprising:
   forming on one side of the substrate a crystallization assisting layer in the form of a discontinuous island-like film of materials having a crystal structure of a face-centered cubic lattice system or of a tellurium (Te)-free material having a crystal structure of a rhombohedral lattice system, an absolute value of lattice unconformity between the crystal structure of the crystallization assisting layer and that of the recording layer being not more than 8%, the material of the crystallization assisting layer containing
   Bi (bismuth) and/or a bismuth (Bi) compound, the thickness of the crystallization assisting layer being from 3 to less than 30 Å; and
   forming a recording layer by sputtering in a crystalline state without initial crystallization directly over the crystallization assisting layer.

2. The method according to claim 1, wherein the recording layer is formed at a substrate temperature in a range of from 45° C. through a temperature inclusive above which temperature the substrate will be deformed.

3. The method according to claims 1, wherein the substrate is produced of polycarbonate; and wherein the recording layer is formed at a substrate temperature in a range of from 45° C. through 110° C. inclusive.

4. The method according to claims 1, wherein the formation of the crystallization assisting layer is performed within a film forming atmosphere to which a nitrogen gas is added.

5. The method according to claims 1, further comprising the steps of:
   forming a first dielectric layer between the substrate and the crystallization assisting layer; and/or
   forming a second dielectric layer on an opposite side of the recording layer from the crystallization assisting layer,
   wherein the formation of the first and/or second dielectric layer is performed within a film forming atmosphere to which a nitrogen gas and/or an oxygen gas is added.

6. An optical information recording medium comprising a recording layer formed on one side of a substrate by sputtering, the recording layer comprising materials whose main components comprise germanium (Ge), antimony (Sb) and tellurium (Te),
   wherein the recording layer is formed in a crystalline state, suitable for recording with laser beam, without initial crystallization; and comprising:
   a crystallization assisting layer, for crystallizing the recording layer at the time of forming the recording layer, in the form of a discontinuous island-like film of materials having a crystal structure of a face-centered cubic lattice system or of a tellurium (Te)-free material having a crystal structure of a rhombohedral lattice system in contact with the substrate side surface of the recording layer, an absolute value of lattice unconformity between the crystal structure of the crystallization assisting layer and that of the recording layer being not more than 8%, the material of the crystallization assisting layer containing bismuth (Bi) and/or a bismuth (Bi) compound, the thickness of the crystallization assisting layer being from 3 to less than 30 Å.

7. The optical information recording medium according to claim 6, wherein a ratio x, y, and z of the elements (Ge, Sb, Te) of the main components of the recording layer (Ge:Sb:Te=x:y:z where x+y+z=1) satisfies the following expressions (1)-(3) simultaneously:

$$0.1 \leq x \leq 0.4 \tag{1}$$

$$0.08 \leq y \tag{2}$$

$$0.45 \leq z \leq 0.65 \tag{3}.$$

* * * * *